June 16, 1953 — A. E. BELL — 2,642,187
FILTER UNIT CONSTRUCTION
Filed Jan. 11, 1950
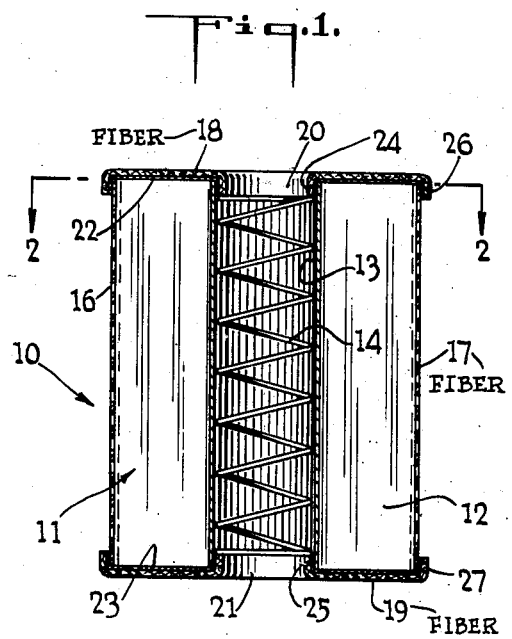
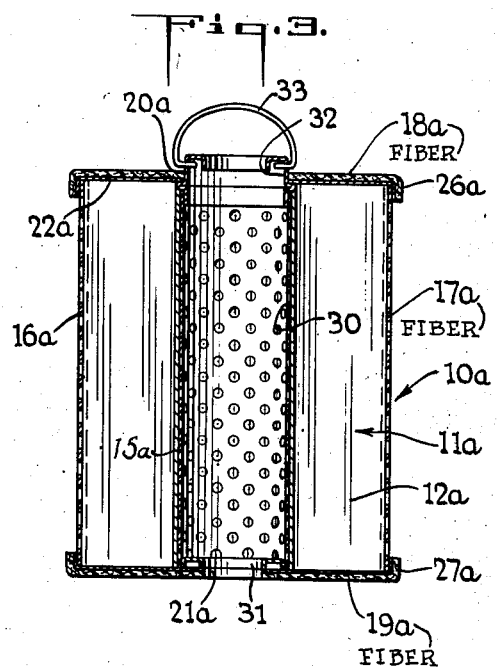
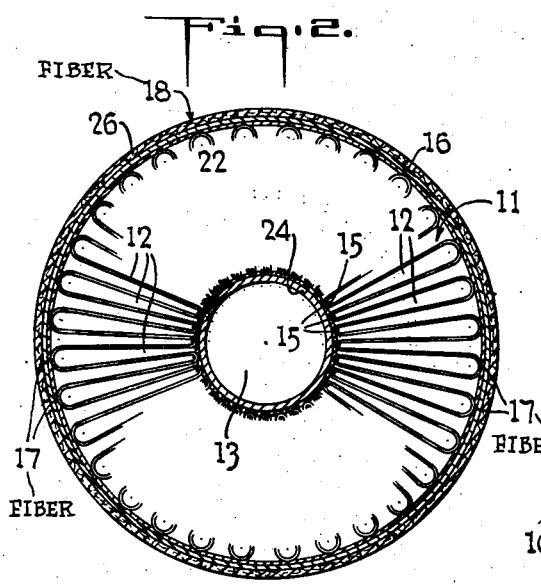
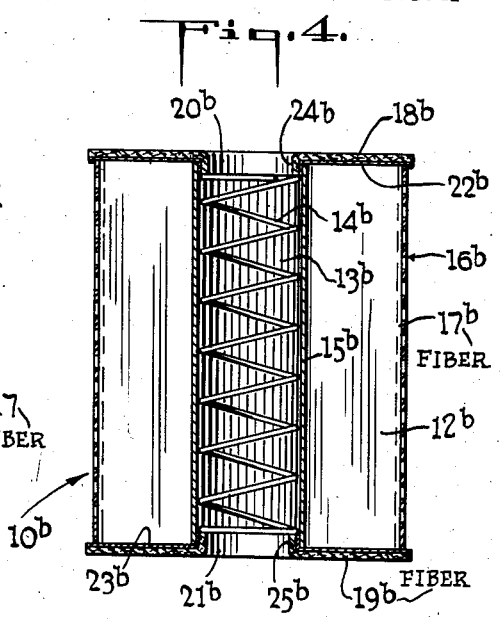
INVENTOR.
ALBERT E. BELL
BY Kenyon & Kenyon
ATTORNEYS Patented June 16, 1953

2,642,187

UNITED STATES PATENT OFFICE 2,642,187

FILTER UNIT CONSTRUCTION

Albert Edward Bell, Union, N. J., assignor to Purolator Products, Inc., Newark, N. J., a corporation of Delaware Application January 11, 1950, Serial No. 138,050

4 Claims. (Cl. 210—169)

This invention relates to filters and more particularly to replaceable element type filter element refills.

Refill filter elements of the type contemplated by this invention embody a substantially tubular filter body element made of resin impregnated filter paper that is pleated and thereafter formed into a tubular body in which the pleats are directed substantially radially of the longitudinal axis. The pleated tubular body heretofore used, thereafter has had its ends sealed off with flat end discs that are also resin impregnated, these end discs being secured to the ends of the pleats by a suitable resin or adhesive bond. Because of the thinness of the end edges of the pleats at their joints with the end discs, difficulty in making an effective bond has frequently been encountered, resulting in lack of necessary rigidity of the unit and also in radial displacement of improperly bonded pleats either during shipment or use and consequent leakage.

The invention herein contemplated has among its objects and features, the elimination of improper bonds, the provision of rigid rugged filter unit structures and the prevention of radial displacement of individual pleats even if a loosening of or defective bonding should result from transportation or use, and prevention of leakage.

With structure embodying the invention, the end discs are curled over the ends of the pleated filter body during bonding, thereby preventing all convolutions or pleats from extending beyond edges of the end discs at any time and thereby preventing leaks at such places. Also a better seal can be made between the end discs and the pleats or convolutions because more of the cement is retained during and after bonding. In addition, greater strength results because of the substantial cup shape of the discs over the obviously weaker structure when a frame is used.

Other objects and novel features will become apparent from the following description and accompanying drawings wherein:

Fig. 1 is a vertical section through a replaceable filler unit embodying the invention;

Fig. 2 is a transverse section taken along the line 2—2 of Fig. 1;

Fig. 3 is a vertical section similar to that of Fig. 1 of a modified construction; and Fig. 4 is a vertical section of a third embodiment of the invention.

Referring to the drawing and first to Fig. 1, 10 denotes generally a replaceable filter unit embodying the invention. This unit includes a body 11 of filter paper or the like, preferably impregnated with phenol formaldehyde resin solution as is well known in this art. This body is pleated to provide pleats 12 as shown in Fig. 2 and the pleated body formed into a tubular body with the pleats 12 extending substantially radially as shown in Fig. 2. The internal hole 13 of the said tubular body contains a helical coil 14 whose turns have substantially the internal diameter of said body and which act as guides or spacers for the inner longitudinal folds 15 of the pleats 12. An external perforated wrapping or cover 16 optionally is wrapped around the outer longitudinal folds 17 of the pleats 12.

End discs 18 and 19, preferably of similar resin impregnated paper, to be mounted at opposite ends of the pleated element, are provided. These end discs are both initially of larger diameter than the outer overall diameter of the tubular element 11 and respectively have center holes 20, 21 of smaller diameter than the hole 13. In applying the end discs to the body 11, the outer edges of the pleats 12 are first coated with a phenol formaldehyde resin cement and the inner faces of the two discs are similarly coated with a similar cement layer 22, 23. The two discs are then applied to the opposite end edges of the pleats 12 with their centers concentric with the longitudinal axis of hole 13. Pressure and heat are then applied to firmly press the end discs against the pleat edges and simultaneously pressure is applied to the overlapping portions of the discs 18 and 19 to turn these edges downwardly around the outer and inner folds 17 and 15 of the pleats and to form the respective inner annular rims 24, 25 and outer rims 26, 27 which because of the cement layers 22, 23 are bonded to the pleats of their respective inner and outer folds. The heat acts to polymerize and set the resin and firmly hold the parts between which the resin cement lies.

In the completed structure, the annular rims 24, 25, 26, 27 provide cup shape formation to the discs and being firmly bonded to the folds of the pleats 12 effectively increase the rigidity and strength of the bonded parts. Moreover, these rims act to maintain fixed positions of the radially extending pleats and to prevent any radial displacement thereof either outwardly or inwardly of the fixed body form, and thereby prevent leakage.

In the embodiment shown in Fig. 3, all parts bearing the same reference characters with added subscripts $a$ correspond to those in Figs. 1 and 2. Herein, however, the spring 14 is replaced by a perforated metal cylinder 30 serving substantially the same purpose as spring 14. The end discs 18a and 19a in their application to the end edges of the pleats 12a, however, are merely turned down at their outer peripheries forming the outer annular flanges 26a, 27a which are bonded to the outer folds 17a of the pleats 12a by thermosetting phenol formaldehyde resin cement 22a in the same way as flanges 26 and 27. Inner flanges corresponding to flanges 24 and 25 are omitted. A guide ring 31 is suitably positioned at one end of the unit being held in place suitably by the disc 19a. Similarly, a second guide ring 32 is suitably held in place at the other end of the unit by the disc 18a. This ring 32 has a bail or handle 33 to facilitate insertion and removal of the unit. As with the modification of Fig. 1, the rims 26a and 27a render the discs cup-like in shape and being firmly bonded to the folds 17a of the pleats 12a effectively increase the rigidity and strength of the bonded parts, and act to prevent radial displacement outwardly of any pleats that may loosen in transit or use of the unit, thereby preventing leakage.

In the embodiment shown in Fig. 4, all parts bearing the same reference characters with added subscripts b correspond to those in Figs. 1 and 2. Herein, however, the end discs 18b and 19b in their application to the end edges of the pleats 12b are only turned down at the peripheries of their holes 20b and 21b forming the inner annular rims or flanges 24b, 25b which are bonded to the inner folds 15b of the pleats 12b by the thermosetting phenol formaldehyde resin cement 22b in the same way as flanges 24 and 25. Outer rims or flanges corresponding to rims or flanges 26 and 27 are omitted.

As with the modification of Fig. 1, the rims 24b, 25b, being firmly bonded to the inner folds 15b of the pleats 12b, effectively increase the rigidity and strength of the bonded parts and act to reduce likelihood of loosening and outward radial displacement of any pleats during transit or use, and thereby prevent leakage.

While specific embodiments of the invention have been disclosed, variations in structural details within the scope of the appended claims are possible and are contemplated. There is no intention, therefore, of limitation to the exact details shown and described.

What is claimed is:

1. A replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to folds of the pleats, said adhesive lying between inner faces of the turned down rims and the folds of the pleats in contact therewith.

2. A replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to inner and outer folds of the pleats, said adhesive lying between inner faces of the turned down rims and the folds of the pleats in contact therewith.

3. A replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to outer folds of the pleats, said adhesive lying between inner faces of the turned down rims and the folds of the pleats in contact therewith.

4. A replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to inner folds of the pleats, said adhesive lying between inner faces of the turned down rims and the folds of the pleats in contact therewith.

ALBERT EDWARD BELL.

References Cited in the file of this patent

UNITED STATES PATENTS

| Number | Name | Date |
| --- | --- | --- |
| 1,148,237 | Kneuper | July 27, 1915 |
| 2,218,339 | Manning | Oct. 15, 1940 |
| 2,239,868 | Williams | Apr. 29, 1941 |
| 2,358,238 | Lindblad | Sept. 12, 1944 |
| 2,395,449 | Briggs | Feb. 26, 1946 |
| 2,571,059 | Puschelberg et al. | Oct. 9, 1951 |

FOREIGN PATENTS

| Number | Country | Date |
| --- | --- | --- |
| 401,287 | Great Britain | Oct. 30, 1933 |